United States Patent [19]

Reddekopp

[11] 4,103,656

[45] Aug. 1, 1978

[54] TRUCK ENGINE AIR PREHEATING SYSTEM

[76] Inventor: Aaron Reddekopp, 12056 N. Jantzen Beach Ave, Portland, Oreg. 97217

[21] Appl. No.: 773,010

[22] Filed: Feb. 28, 1977

[51] Int. Cl.² ............................................. F02M 31/00
[52] U.S. Cl. ............................. 123/122 D; 123/122 H; 60/599
[58] Field of Search .......... 123/122 D, 122 H, 119 C, 123/122 R; 60/599

[56] References Cited

U.S. PATENT DOCUMENTS

| | | | |
|---|---|---|---|
| 1,512,527 | 10/1924 | Edens | 123/122 D |
| 1,904,429 | 4/1933 | Evans | 123/122 D |
| 2,633,698 | 4/1953 | Nettel | 123/122 D |
| 3,974,802 | 8/1976 | Lundquist | 123/122 D |
| 4,020,815 | 5/1977 | Hubert | 123/122 D |

Primary Examiner—Ronald H. Lazarus
Attorney, Agent, or Firm—Klarquist, Sparkman, Campbell, Leigh, Hall & Whinston

[57] ABSTRACT

A manifold chamber placed over the exhaust manifold of a truck engine has an outlet connected to a large valve mounted on a cross-wise muffler at the rear of a cab of the truck. The valve may be selectively set in a heating condition connecting the heated air from the manifold chamber to an air cleaner and a turbocharger of the truck or a cooling condition connecting a cold air intake mounted on the valve to the air cleaner and the turbocharger.

8 Claims, 7 Drawing Figures

TRUCK ENGINE AIR PREHEATING SYSTEM

DESCRIPTION

This invention relates to a truck air preheating system, and has for an object thereof the provision of a truck air preheating system for air supplied to a truck engine.

Another object of the invention is to provide a preheating system which is selectively set in either a heating condition supplying air to a turbocharger from a path leading over an exhaust manifold of a truck engine and a muffler or a cool condition supplying substantially unheated air to the turbocharger.

A further object of the invention is to provide a preheating system which is easily installed on existing trucks.

Another object of the invention is to provide a preheating system comprising a manifold chamber having a cold air intake and a chambered value mounted on a muffler and adapted to be set either in a heating condition connecting the manifold chamber to a turbocharger or a normal condition closing off the manifold chamber from the turbocharger and connecting a cold air stack to the turbocharger.

Figure 1:
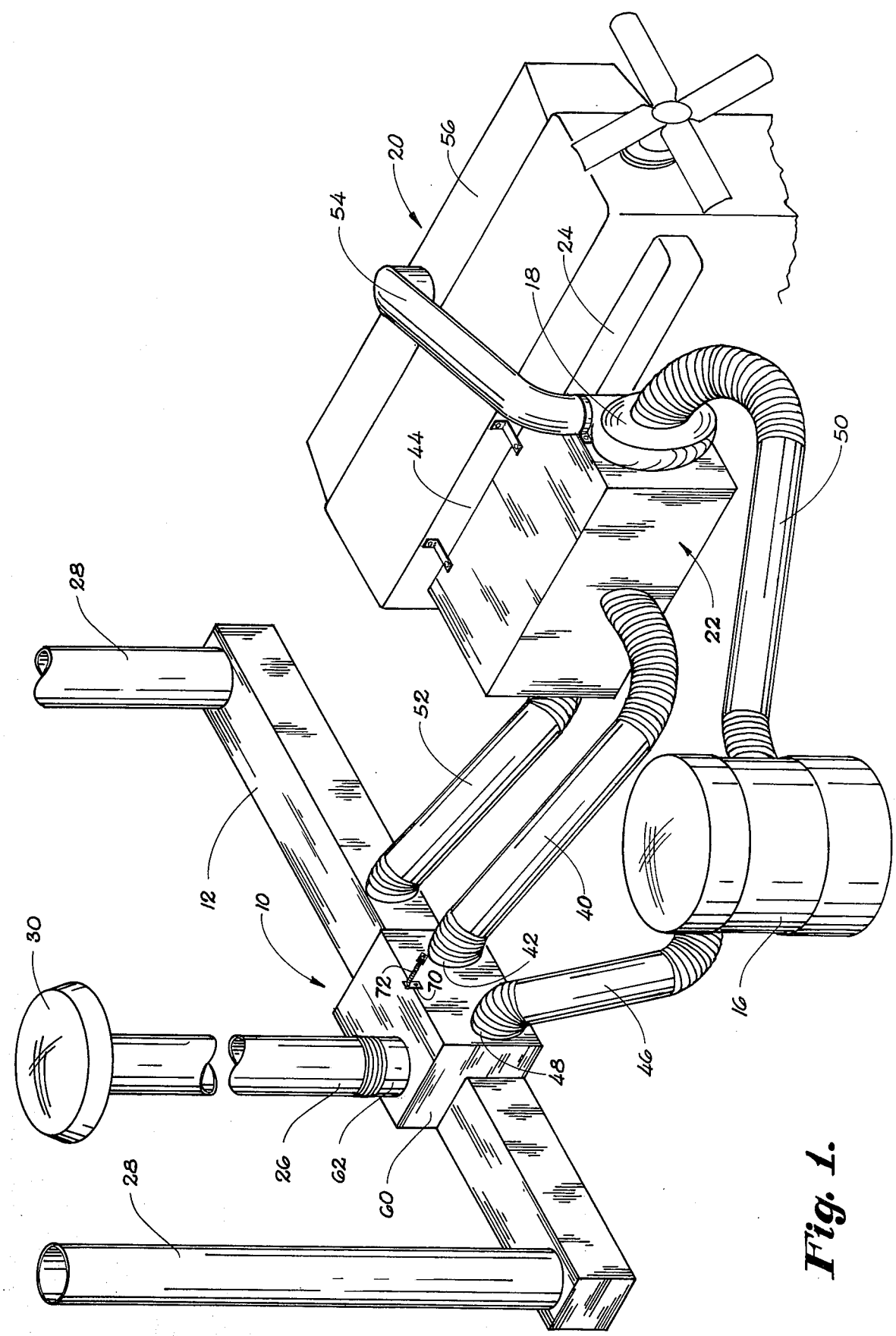
FIG. 1 is a perspective, schematic view of a truck with a truck air preheating system forming one embodiment of the invention.
Figure 4:
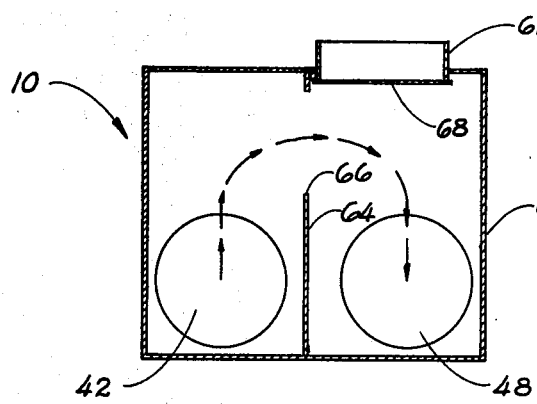
FIG. 4 is a view like FIG. 3 but with the valve in a preheating condition supplying heated air to the engine.
Figure 3:
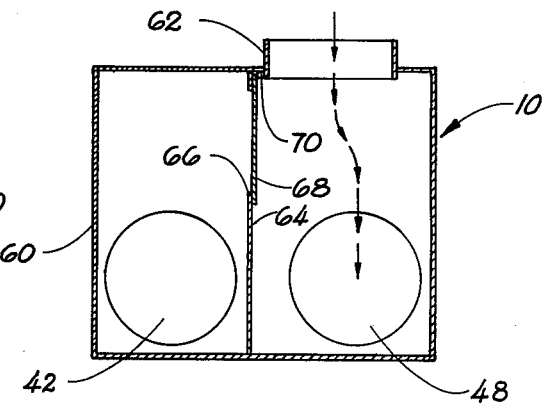
FIG. 3 is a vertical sectional view taken along line 3—3 of FIG. 2 with the valve supplying cool air.
Figure 7:
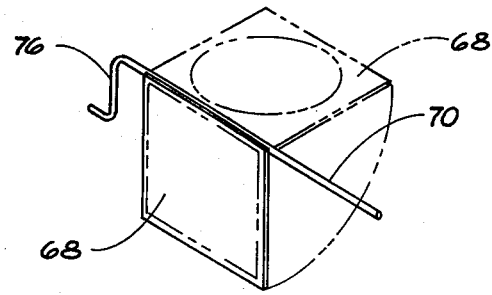
FIG. 7 is a perspective view of a valve closure member of the valve.
Figure 2:
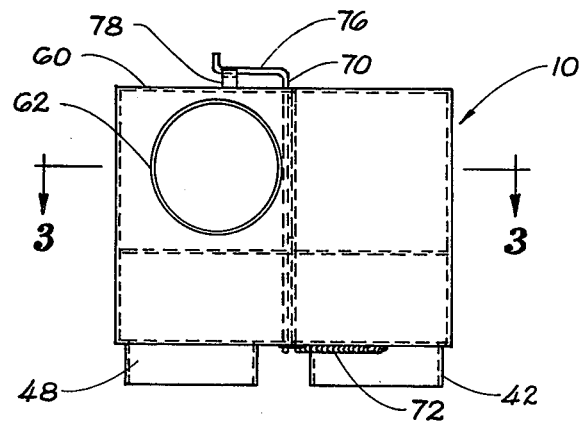
FIG. 2 is an enlarged top plan view of a valve of the preheating system of FIG. 1.
Figure 5:
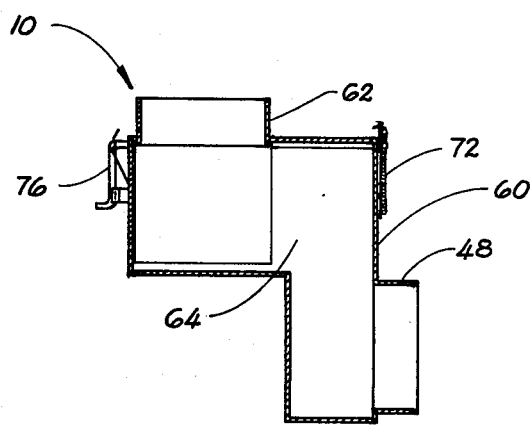
FIG. 5 is a vertical sectional view of the valve taken along line 5—5 of FIG. 6.
Figure 6:
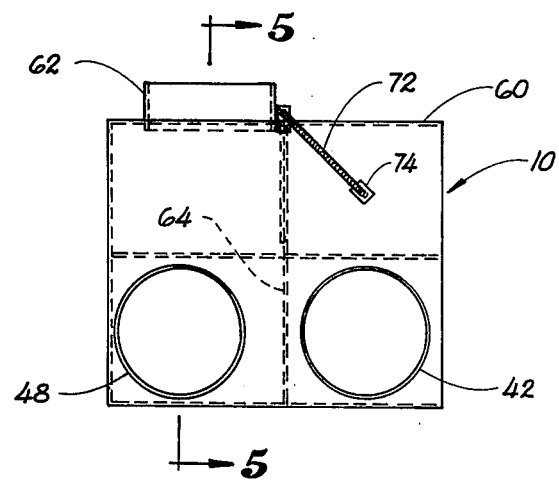
FIG. 6 is a vertical sectional view taken along line 6—6 of FIG. 5.

A truck engine air preheating system forming one specific embodiment of the invention includes a valve 10 mounted on a crosswise muffler 12 behind a cab (not shown) of a truck. The valve may be selectively set in a preheating condition connecting to a filter 16 and a turbocharger 18 of an engine 20 a manifold chamber 22 mounted on the engine 20 in a position covering a large portion of an exhaust manifold 24 of the engine and directing air over the exhaust manifold to preheat the air or in a normal condition in which the valve closes off the manifold chamber from the filter and the turbocharger and connects a fresh air stack 26 to the filter and the turbocharger. Tailpipes 28 are mounted on the crosswise muffler. The stack 26 has a cover 30 keeping out moisture.

The chamber 22 is of sheet metal and is open on the engine side so that air drawn through the chamber contacts and flows over the exhaust manifold 24 and is heated thereby. The air flows from the chamber 22 through a conduit 40 to a preheated air inlet port 42 of the valve 10, air entering the chamber 22 through an inlet port 44. A conduit 46 leads from an outlet port 48 of the valve to the filter or cleaner 16, and a conduit 50 leads from the filter to the turbocharger 18. An exhaust pipe 52 leads from the exhaust manifold to the crosswise muffler, and a conduit 54 of the turbocharger leads to intake 56 of the engine.

The valve has a sheet metal chamber 60, which is L-shaped with a cold air inlet port 62 on its top, on which port 62 of the stack 26 is mounted. A vertical partition 64 has a port 66 closable by a sheet metal valve member 68 welded to a rod 70. A spring 72 attached to the rod and a hook 74 normally pulls the valve member 68 to a position closing the port 66. However, the user can through a handle 65 swing the valve member 68 to a preheating position opening the port 66 and closing the port 62. A releasable latch 78 holds the rod 70 in its preheating position.

The chamber 60 preferably is brazed to the top and front side of the muffler 12 in face-to-face contact therewith and is heated by the muffler to impart some heat to the air being drawn through the chamber 10 by the turbocharger 18.

What is claimed is:

1. In combination with a truck tractor including an engine having a hot exhaust manifold and a turbocharger,
    a muffler extending crosswise of the tractor and connected to the exhaust manifold,
    a valve mounted on the muffler having a preheated air inlet, a cold air inlet, an outlet and closure means selectively movable between a normal condition wherein the cold air inlet is connected to the outlet and the preheated air inlet is closed and a preheating condition in which the preheated air inlet is connected to the outlet and the cold air inlet is closed,
    a manifold chamber in a heat exchange relationship with the hot exhaust manifold and connected to the preheated air inlet,
    and means connecting the outlet of the valve to the turbocharger.

2. The combination of claim 1 wherein the valve has a valve chamber in heat exchange relationship with the muffler.

3. The combination of claim 2 wherein the valve chamber extends at least partially around the muffler.

4. The combination of claim 3 wherein the muffler is rectangular in transverse cross-section and the valve chamber is generally L-shaped and sits on the top of the muffler with a leg thereof abutting the front of the muffler.

5. The combination of claim 4 wherein the preheated air inlet and the outlet are in the leg and facing forwardly.

6. The combination of claim 5 wherein the valve includes a vertical partition having a port and separating the chamber into a preheated air portion and an outlet portion,
    the cold air inlet opening into the outlet portion and the preheated air inlet leading into the preheated air portion,
    and a valve closure member movable between a first position closing the port and a second position opening the port and closing the cold air inlet.

7. The combination of claim 1 wherein the valve has a valve chamber substantially L-shaped.

8. In combination with a truck tractor including an engine having a hot exhaust manifold and a turbocharger,
    a valve having a preheated air inlet, a cold air inlet, an outlet and closure means selectively movable between a normal condition wherein the cold air inlet is connected to the outlet and the preheated air inlet is closed and a preheating condition in which the preheated air inlet is connected to the outlet and the cold air inlet is closed, a manifold chamber in a heat exchanger relationship with the hot exhaust manifold and connected to the preheated air inlet, and means connecting the outlet of the valve to the turbocharger.

* * * * *